United States Patent
Wang et al.

(10) Patent No.: US 6,903,769 B1
(45) Date of Patent: Jun. 7, 2005

(54) DETECTING HOPPING PIXEL DEFECTS IN CCD IMAGE SENSORS

(75) Inventors: Shen Wang, Rochester, NY (US); Thomas R. Carducci, Brockport, NY (US)

(73) Assignee: Eastman Kodak Company, Rochester, NY (US)

(*) Notice: Subject to any disclaimer, the term of this patent is extended or adjusted under 35 U.S.C. 154(b) by 879 days.

(21) Appl. No.: 09/652,316

(22) Filed: Aug. 31, 2000

(51) Int. Cl.$^7$ .................................................. H04N 9/64
(52) U.S. Cl. ...................................... 348/246; 382/149
(58) Field of Search ................................. 382/149, 219, 382/274; 348/243, 246, 247, 244

(56) References Cited

U.S. PATENT DOCUMENTS

| | | | | |
|---|---|---|---|---|
| 4,253,120 A | * | 2/1981 | Levine | 348/246 |
| 5,159,457 A | * | 10/1992 | Kawabata | 348/246 |
| 5,796,430 A | * | 8/1998 | Katoh et al. | 348/246 |
| 6,529,622 B1 | * | 3/2003 | Pourjavid | 382/149 |
| 6,593,961 B1 | * | 7/2003 | Perino | 348/187 |
| 6,661,456 B1 | * | 12/2003 | Aufrichtig et al. | 348/247 |
| 6,683,643 B1 | * | 1/2004 | Takayama et al. | 348/247 |

* cited by examiner

Primary Examiner—Thai Tran
Assistant Examiner—Brian Jelinek
(74) Attorney, Agent, or Firm—Peyton C. Watkins

(57) ABSTRACT

A method for determining if there is a temperature dependent hopping pixel defect in an image sensor, including the steps of providing an image sensor in a heated environment having a temperature selected such that hopping pixel defects can be detected; and operating the image sensor and analyzing the output of the pixels of the image sensor to determine if there are hopping pixel defects.

5 Claims, 7 Drawing Sheets

US 6,903,769 B1

DETECTING HOPPING PIXEL DEFECTS IN CCD IMAGE SENSORS

FIELD OF THE INVENTION

This invention relates to detecting hopping pixel defects in CCD image sensors.

BACKGROUND OF THE INVENTION

Image sensors typically are in the form of linear and area image sensors. These sensors are often provided by charge coupled devices (CCDs). Area image sensors can take the form of interline image sensors and full frame image sensors. There are a number of defects which affect image quality in image sensors. Of particular concern is a hopping pixel defect. This defect often comes up in a random fashion and so unless it is detected in an image sensor through manufacturing quality control, the image sensor will be delivered to the general public and have this defect. A hopping pixel defect is defined as a pixel whose dark signal level varies beyond the random noise along with the time.

FIG. 1a depicts a series of test for an individual pixel in an image sensor in which the output from the series of test is plotted as signal level versus time. FIG. 1a also illustrates a representative output for a particular pixel that does not have a hopping pixel defect. FIG. 1b depicts a histogram for the data of the pixel shown in FIG. 1a which is a plot of the counts or frequency versus signal level. It shows that the normal dark signal obeys a Gaussian distribution and it has only one peak which means the pixel has only one signal level. FIGS. 1c and 1d show similar plots to those respectively in FIGS. 1a and 1b, but in this case an individual pixel has a hopping pixel defect. In FIG. 1d the hopping pixel has two peaks which represent two different signal levels. One is the normal dark signal level (about 372 counts) and the other one is the hopping signal level (about 386 counts). In this case, 8 digital counts equal to 1 millivolt. Therefore, the hopping magnitude is about 1.75 millivolt.

Heretofore it has been difficult to detect such defects. The difficulty of the task is that the hopping pixel signal is very small (almost down to a couple of millivolts, close to the test system noise level) and hopping rate is random (some defects may hop once per milliseconds and others may take minutes or even hours to hop once).

SUMMARY OF THE INVENTION

It is an object of the present invention to provide a test method for effectively detecting hopping pixel defects in an image sensor.

It has been discovered that the hopping magnitude and hopping rate increase with the increase of the temperature. The present invention makes use of a heated environment to detect hopping pixel defects in an image sensor.

This object is achieved by a method for detecting if there are any temperature dependent hopping pixel defects in an image sensor, comprising the steps of:
  (a) providing an image sensor in a heated environment having a temperature selected such that hopping pixel defects can be detected; and
  (b) testing the image sensor and analyzing the output of the pixels of the image sensor to determine if there are any hopping pixel defects.

It is a feature of the present invention that by testing an image sensor at higher temperature allows an amplification of a defect's signature, namely its hopping magnitude and hopping rate, so that small defect signal which is usually hidden in the system noise at ambient temperature can be detected.

DETAILED DESCRIPTION OF THE INVENTION

FIGS. 1a–1d are comparisons of dark signal levels and their histograms between a good pixel and a hopping pixel which have already been discussed in Background of the Invention section.

Figure 1A:
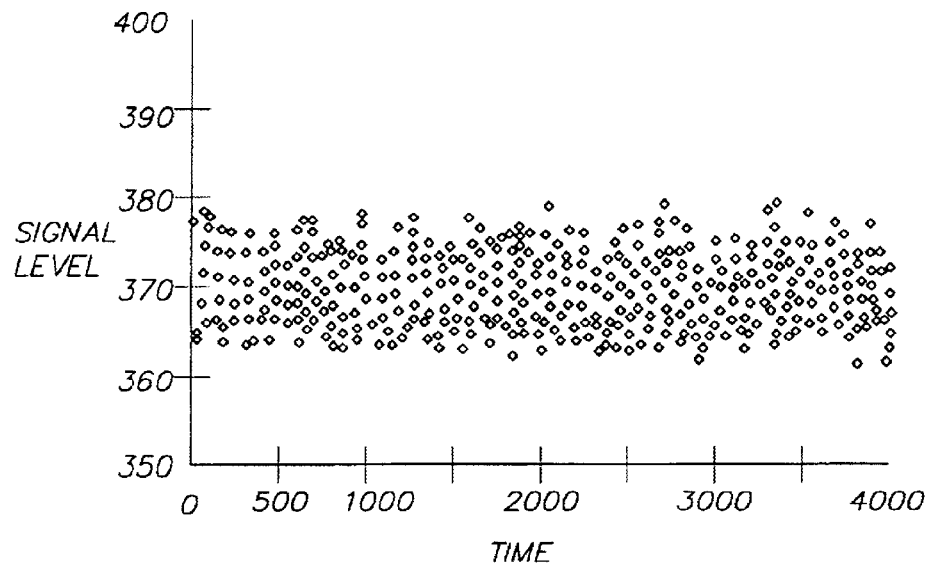
FIGS. 1a and 1b depict graphs previously described for a particular pixel in an image sensor which does not have a hopping pixel defect.
Figure 1B:
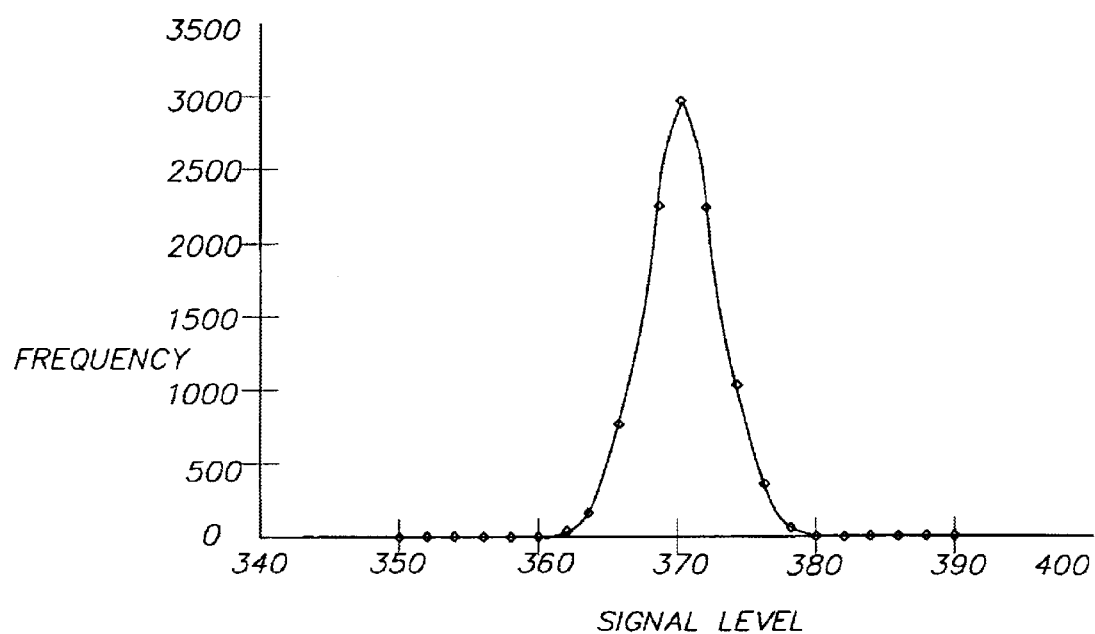
Figure 1C:
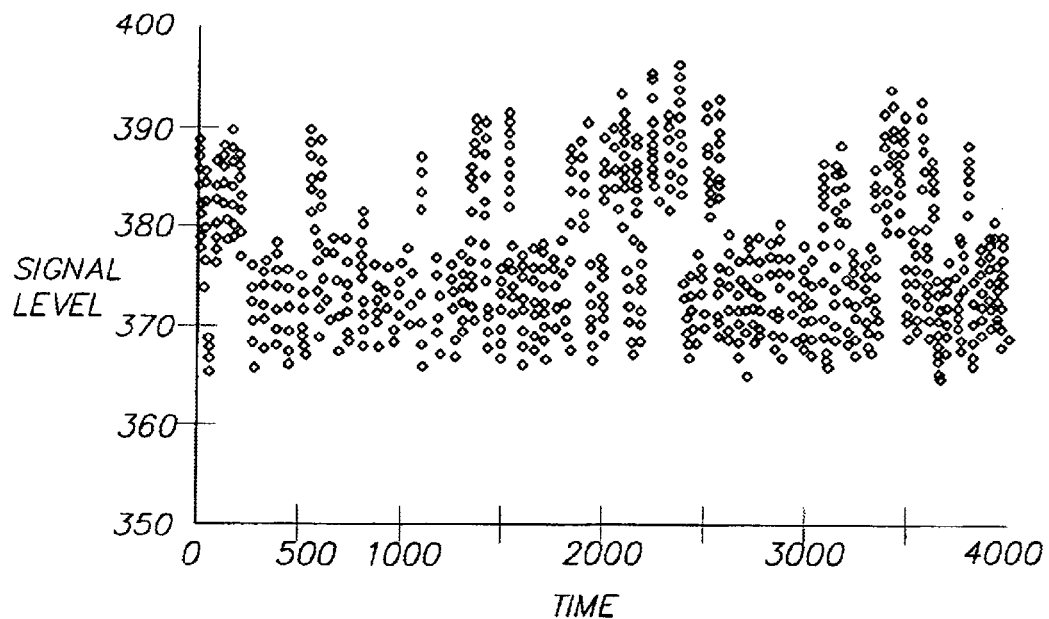
FIGS. 1c and 1d depict graphs previously described for a particular pixel in an image sensor which does have a hopping pixel defect.
Figure 1D:
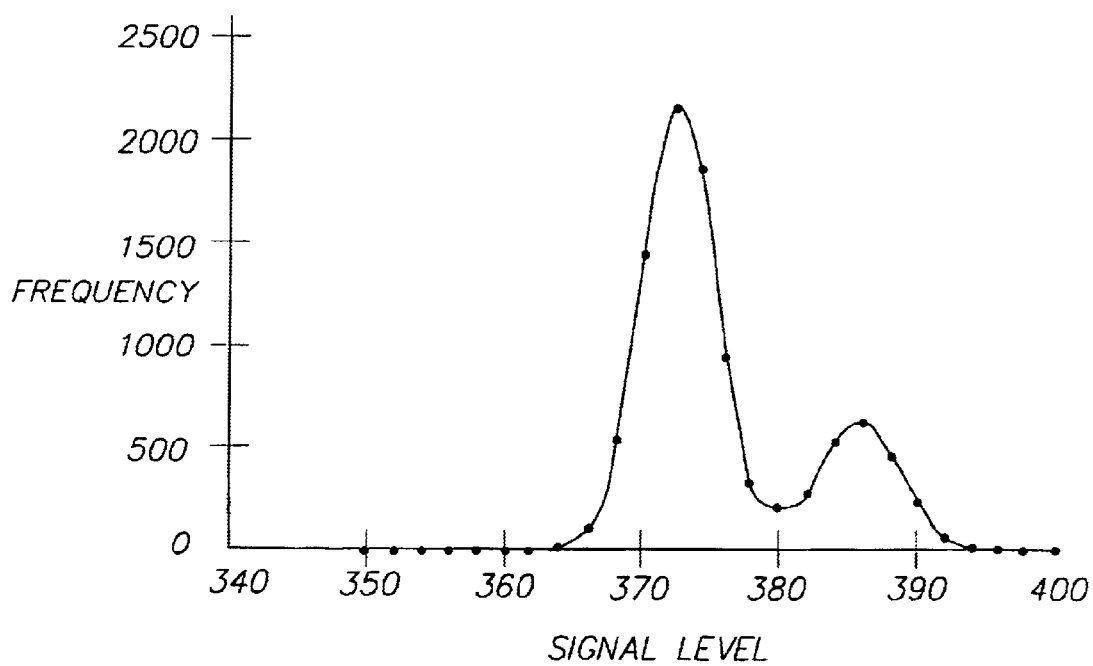
Figure 2:
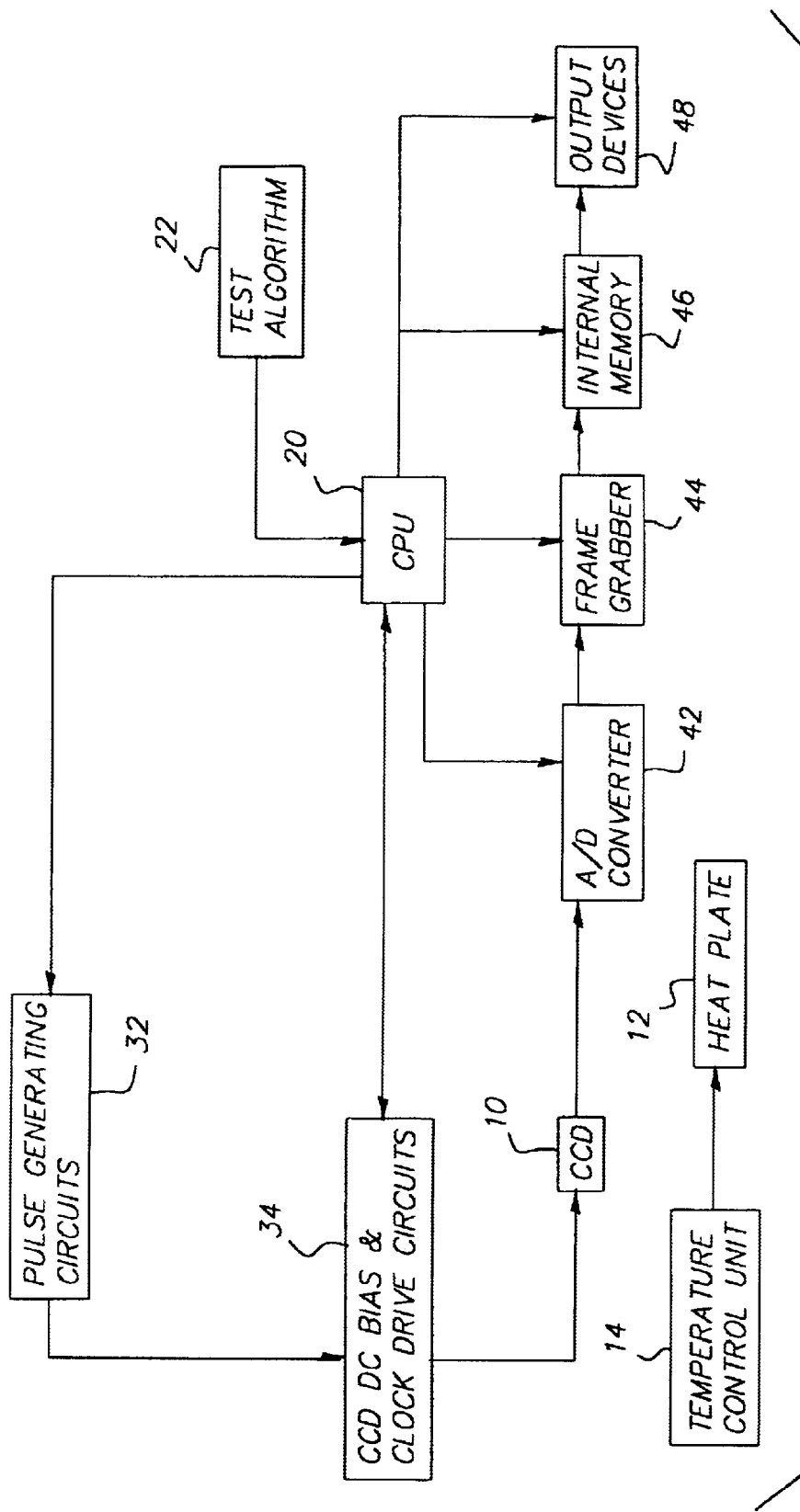
FIG. 2 depicts a representative test system for detecting for hopping pixel defects.

FIG. 2 is a representative diagram showing a test system for detecting hopping pixel defects in image sensors. A CCD image sensor 10 is seated on a heat plate 12 of which temperature is controlled by a temperature control unit 14. The temperature of the plate 12 is typically adjusted so that the CCD image sensor 10 when operated will be at temperature in the range of about 20 to 80° C. As previously discussed, it has been determined that by heating the CCD image sensor 10 under test, the hopping pixel defects will become more pronounced and occur more frequently. The system has power supplies and pulse generating circuits 32 controlled by a central processing unit (CPU) 20 to support CCD DC bias and clock driver circuits 34. The clock driver circuits 34 operates the CCD in a well known fashion under the control of the pulse generating circuits 32. The CCD output signals are digitized and synchronized to display results on output device 48 (commonly a cathode ray tube (CRT)) through an A/D converter 42, a frame grabber 44 and its internal memory 46. A test algorithm 22 (will be discussed later) is fed into the CPU 20 at the beginning of the test and the CPU 20 controls the operating conditions of the CCD image sensor 10 and starts the test. The CPU 20 calculates the test results in its internal memory 46 according to the test algorithm 22 and sends the final results to output device 48. The test is finished by mapping detected hopping pixel defects in the CCD image sensor 10 to the output device 48. See FIGS. 4a–e.

Figure 3:
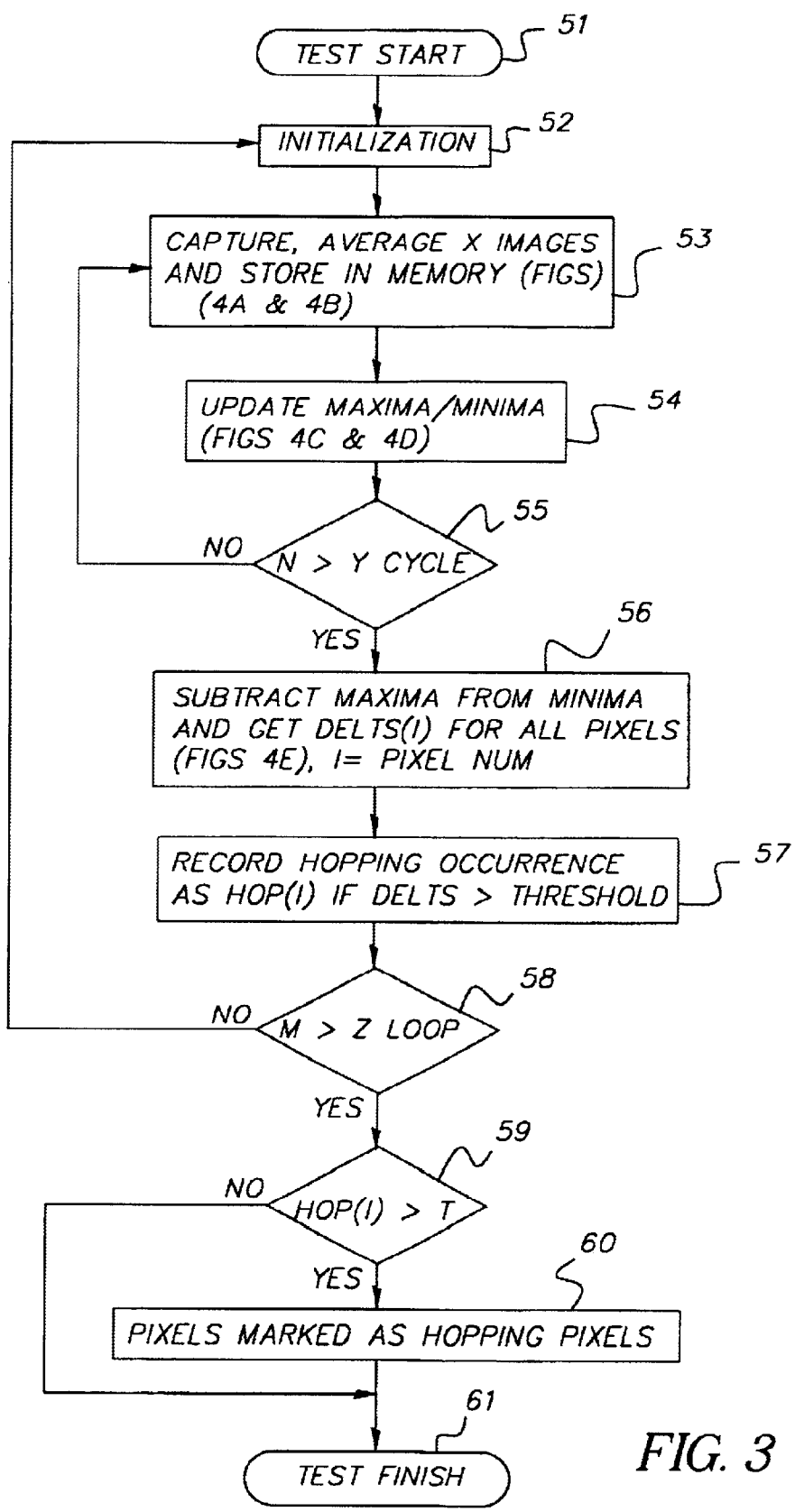
FIG. 3 shows a flowchart of a test algorithm in the system of FIG. 2 to determine if there are any hopping pixel defects in an image sensor being tested in FIG. 2.
Figure 4A:
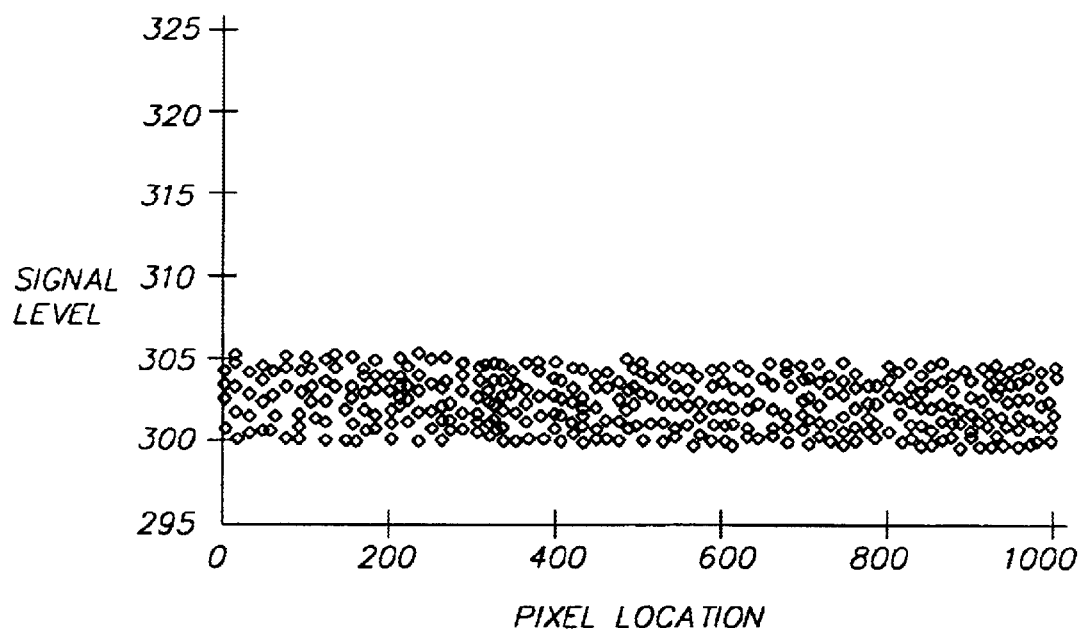
FIGS. 4a–e depict the output of various stages in the operation of the system of FIG. 2 and corresponding to positions in FIG. 3.
Figure 4B:
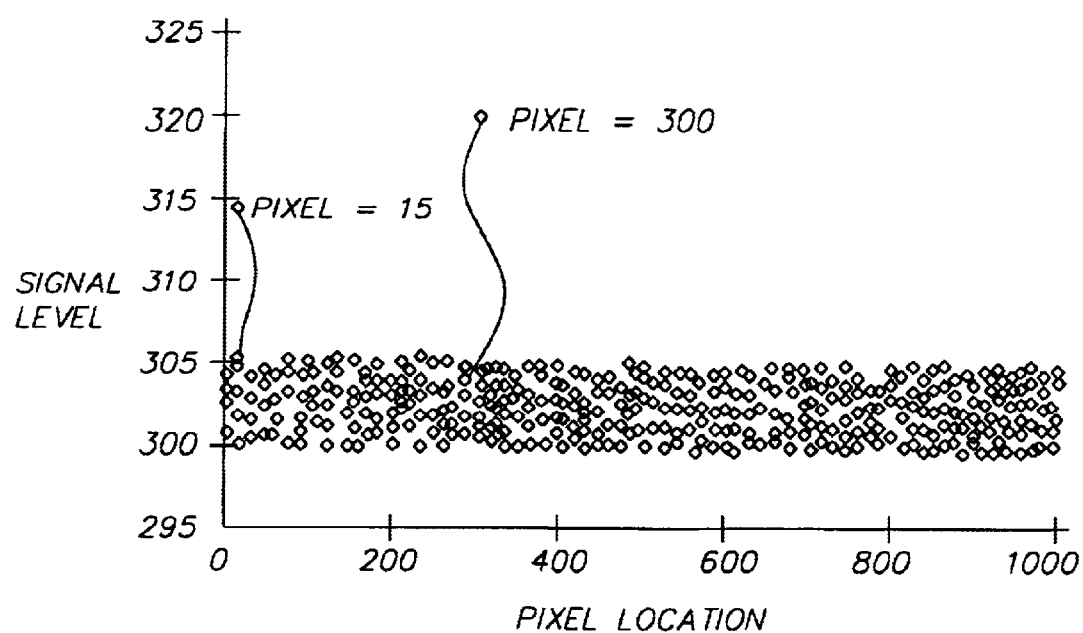
Figure 4C:
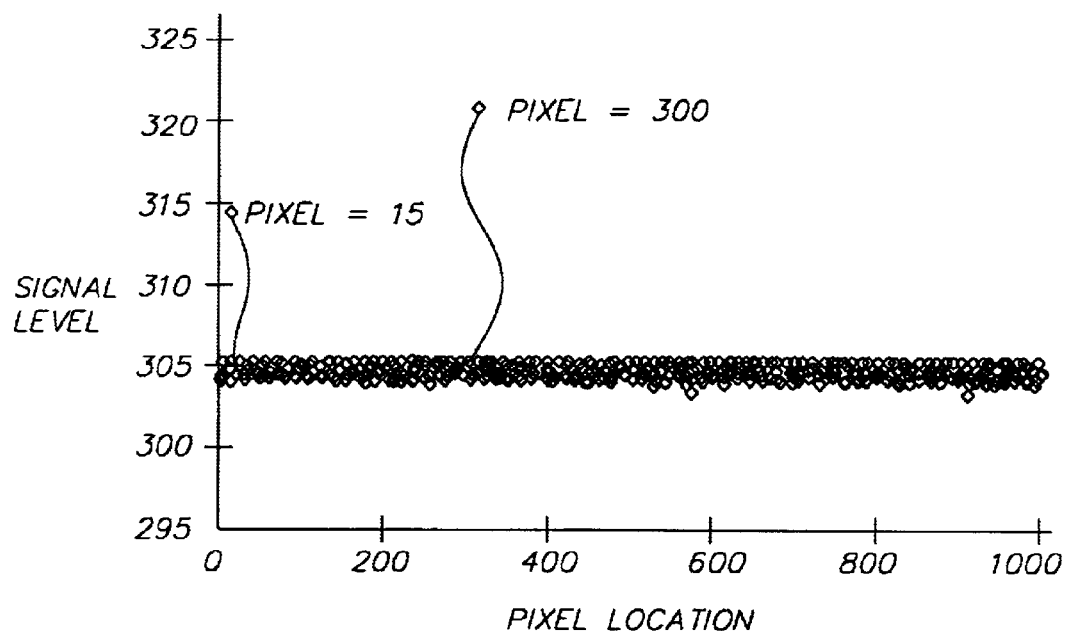
Figure 4D:
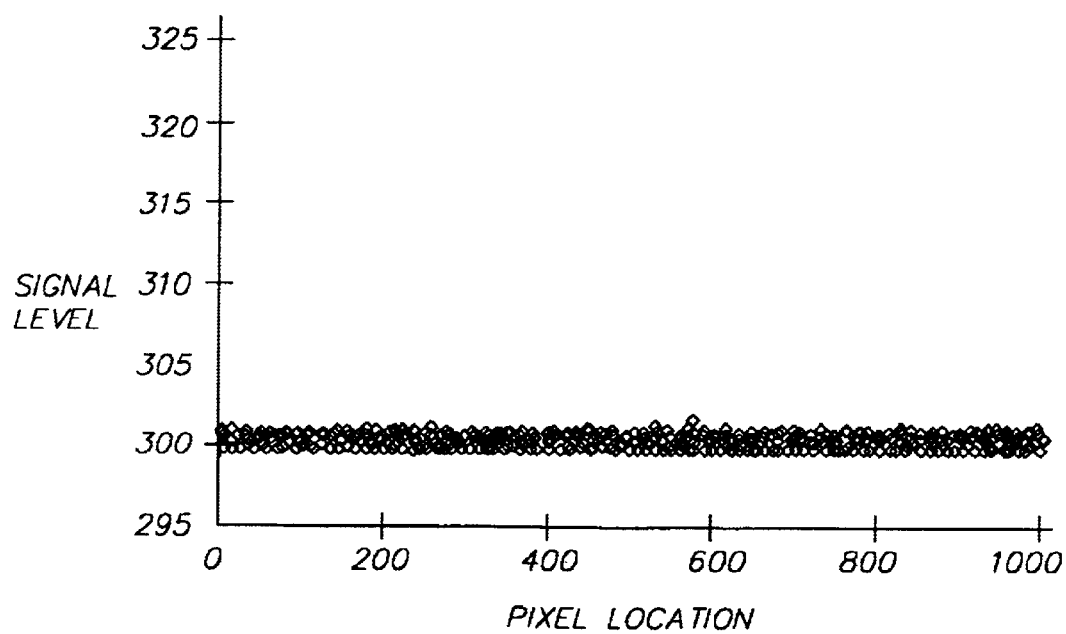

FIG. 3 depicts a flowchart of a test algorithm for operating the system of FIG. 2 to detect hopping pixel defects. When a test of a CCD image sensor 10 (FIG. 2) starts in block 51, a CPU 20 (FIG. 2) is initialized in block 52. Next in block 53 the CPU 20 (FIG. 2) operates the system of FIG. 2 so that a number of frames (X) of output signals are captured. These output signals for each pixel are averaged and then stored in an internal memory 46 (FIG. 2). FIG. 4a shows an eight count-averaged output signals for the first cycle of the pixel in a 1 K linear CCD image sensor 10 being tested at 40° C. This capturing process repeats for a certain number of cycles (Y) which is predefined at the beginning of the test showing in block 55. FIG. 4*b* is the output signal of the 30$^{th}$ count cycle. In this chart, there are two pixels which have signal levels significantly higher than the normal level. For each count cycle, the CPU 20 (FIG. 2) then updates the output signals in block 54 so as to store the maximum and minimum pixel values captured in the CCD image sensor 10 (FIG. 2). FIGS. 4*c* and 4*d* show the maximum and minimum pixel values captured during the Y cycles in the CCD image sensor 10 (FIG. 2).

Figure 4E:
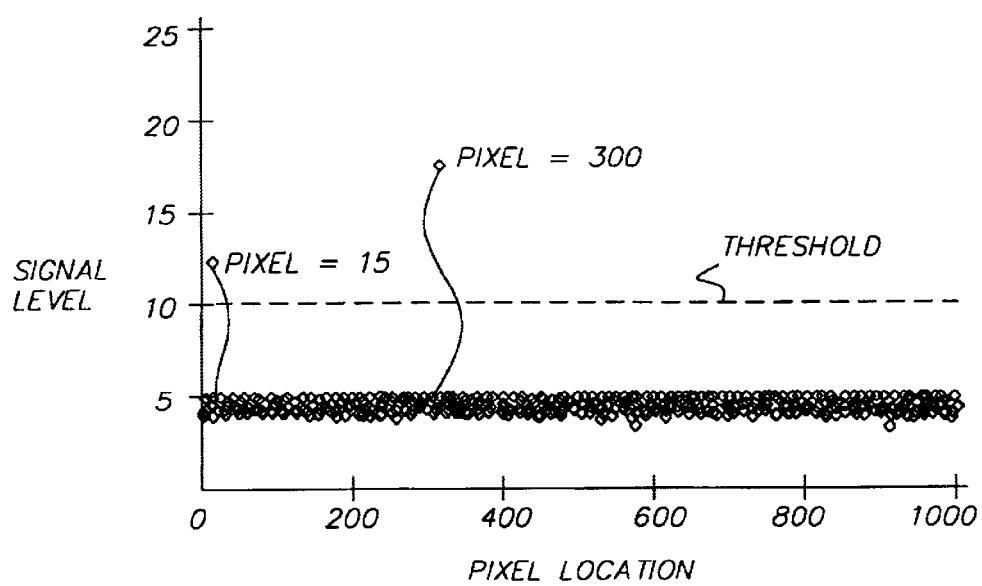

In block 56 the CPU 20 (FIG. 2) subtracts the maximum from the minimum values for all pixels and gets the difference hereinafter referred to as Delts(I) (I is the index of pixels). Also FIG. 4*e* shows the signal level of Delts(I). Comparing Delts(I) with a predefined threshold determines if a pixel has a potential hopping pixel defect as shown in block 57. If the Delts(I) is larger than the threshold, the pixel I is called a potential hopping pixel. FIG. 4*e* show pixels 15 and 300 have potential hopping pixel defects. Also in block 57 the CPU 20 (FIG. 2) records the occurrence of those pixels being marked as potential hopping pixels. Therefore, in this pixel 15 and 300 are each recorded as one occurrence of potential hopping pixels.

Sometimes during the test, burst noise can be randomly generated from other sources such as electronic circuitry such as CPU 20 malfunction other than the CCD image sensor 10 itself. It is important to take this noise into account. Therefore, usually the above test repeats for a couple of loops (Z) showing in block 58. In each loop for all pixels, the CPU 20 records the occurrences of their being caught as potential hopping pixels. Only those pixels with occurrences greater than a predefined value (T) are finally marked as hopping pixels. The process is shown in blocks 59 and 60. Block 61 represents the end of the test. For example, if Z equals 2, it means the whole test repeats twice. In the second test loop, pixel 15 is recorded again as a potential hopping pixel, but not pixel 300. If the predefine value T is 1, it means only those pixels whose occurrences being recorded as potential hopping pixels are greater than 1 are finally reported as hopping pixels. In this case, only pixel 15 is reported as a hopping pixel but not pixel 300 since pixel 300 is only recorded once and pixel 15 is recorded twice.

Depending on the noise performance of the test system showing in FIG. 2, the number of X-frame-average can be varied. Typically X equals from 4 to 16. Another parameter, the repeated cycle Y, is determined by the sensor's application such as the maximum duration time of the CCD image sensor 10's single task, the quality factor and the cost. The larger Y, the longer time the sensor being tested and the better chance to capture the defective parts, but in higher cost. Also the numbers of Z and T can be varied with different applications. The threshold of determining if a pixel has a hopping defect mainly depends on customer's applications. It is usually much lower in the high-end applications than in the low-end applications.

A typical setting in the test system shown in FIG. 2 is as follows. At temperature Temp=40° C., X=8, Y=50, Z=5, T=3.

FIGS. 4*a*–4*e* have already been described in this section which show the output profiles in different test stages in blocks 53, 54 and 56 (FIG. 3). These outputs can, of course, be visually produced by output device 48.

The invention has been described in detail with particular reference to certain preferred embodiments thereof, but it will be understood that variations and modifications can be effected within the spirit and scope of the invention.

PARTS LIST

10 image sensor
12 heat plate
14 temperature control unit
15 hopping pixel
20 central processing unit
22 test algorithm
32 pulse generating circuits
34 clock driver circuits
42 A/D converter
44 frame grabber
46 internal memory
48 output device
51 block
52 block
53 block
54 block
55 block
56 block
57 block
58 block
59 block
60 block
61 block
300 hopping pixel

What is claimed is:

1. A method for determining if there is a temperature dependent hopping pixel defect in an image sensor, the method comprising the steps of:
   (a) capturing at least two images;
   (b) determining one or more substantially maximum and minimum pixel values at the same pixel location in the two or more images;
   (c) calculating one or more differences between the substantially maximum and minimum values for obtaining one or more delta values;
   (d) comparing the one or more delta values with a threshold; and
   (e) recording the pixels whose delta values are beyond the threshold as hopping pixels.

2. The method as in claim 1 further comprising the step of (f) providing a heating unit that receives the image sensor and provides predetermined heated temperature conditions to which the image sensor is subjected before capturing the two or more images to increase efficiency of capturing the hopping pixel.

3. The method as in claim 1 further comprising the step of repeating steps (a) through (e) for increasing accuracy of capturing the hopping pixel.

4. The method as in claim 2 further comprising the step of repeating steps (a) through (f) for increasing accuracy of capturing the hopping pixel.

5. The method as in claim 1 further comprising the step of displaying the hopping pixel on a display.

* * * * *